(12) United States Patent
Clegg

(10) Patent No.: US 6,755,087 B2
(45) Date of Patent: Jun. 29, 2004

(54) LOAD CELL HAVING OVERLOAD PROTECTION

(75) Inventor: LaVar Clegg, Scottsdale, AZ (US)

(73) Assignee: Interface, Inc., Scottsdale, AZ (US)

( * ) Notice: Subject to any disclaimer, the term of this patent is extended or adjusted under 35 U.S.C. 154(b) by 168 days.

(21) Appl. No.: 09/991,612

(22) Filed: Nov. 26, 2001

(65) Prior Publication Data

US 2003/0097887 A1 May 29, 2003

(51) Int. Cl.[7] .............................. G01L 1/04; G01L 1/22; G01L 1/08
(52) U.S. Cl. ........................ 73/862.639; 73/862.634; 73/862.621
(58) Field of Search ............... 73/862.639, 862.634, 73/862.621, 862.629, 862.637, 862.382

(56) References Cited

U.S. PATENT DOCUMENTS

| | | | | |
|---|---|---|---|---|
| 4,261,429 A | * | 4/1981 | Lockery | 177/211 |
| 4,506,746 A | * | 3/1985 | Lockery | 177/211 |
| 4,600,066 A | * | 7/1986 | Griffen et al. | 177/211 |
| 6,504,114 B1 | * | 1/2003 | Lockery et al. | 177/229 |

FOREIGN PATENT DOCUMENTS

EP 251175 A2 * 1/1988 ............. G01L/1/22

* cited by examiner

*Primary Examiner*—Edward Lefkowitz
*Assistant Examiner*—Lilybett Martir
(74) *Attorney, Agent, or Firm*—Joseph H. Roediger; Gregory J. Nelson

(57) ABSTRACT

A load cell having overload protection wherein a central cantilever beam is provided between the sensing beams in the load cell structure and is bounded by slots of narrow gap width. When an excess load is applied, the load cell structure is deformed and contacts the cantilever beam to transfer the load thereto. The gap width determines the amount of applied load which initiates the protection.

6 Claims, 1 Drawing Sheet

LOAD CELL HAVING OVERLOAD PROTECTION

BACKGROUND OF THE INVENTION

This invention relates to load cells and in particular, to a structural member for a load cell that includes overload protection.

In general, a load cell includes as elements formed in a resilient body: a load receiving end portion, a fixed end portion and a pair of sensing beams generally orthogonally disposed therebetween. The sensing beams have strain gages applied thereto. The application of a load to the receiving end coupled with restraint of the opposing fixed end results in relative deflection of the elements in the parallelogram structure. The electrical strain gages are sensitive to the dimensional changes in the load cell structure and an accurate reading of the applied load is derived by external measurement apparatus.

One of the many advantages of a load cell is the lack of individual mechanical parts that are responsive to applied loads and therefore subject to wear from repeated use. The rendering of repeatable and accurate readings by a load cell relies primarily on the structural integrity of the design and the materials used in the load cell structure. Thus, a unitary design relying on a single structural member is preferred. The application of forces in excess of the rated capacity of a load cell plus any design margin can alter the geometry of the load cell structure thereby introducing errors into subsequent readings. Both accuracy and precision are adversely affected. In cases of excessive applied loads, for example, sudden impact loads, the load cell structure can be damaged to the point where it is no longer suitable for use.

To compensate for the application of excessive loads, overload protection is often incorporated in the load cell. One such method of providing overload protection is disclosed in U.S. Pat. No. 4,467,661 to Somal wherein self-contained protection located within the load cell structure utilizes a cantilever beam in combination with an external overload pin extending through the load cell structure into an oversize hole in the end of the beam. The protection feature disclosed therein has the advantage of being confined within the outline of the load cell so that the overall size of the device is not changed. However, in order to obtain the overload protection, additional manufacturing steps are required to provide the receiving holes for a stepped pin. The stepped pin is inserted through the body of the device into the end of the beam. The diameter of the free end of the pin is less than the diameter of the receiving hole in the free end. The clearance between pin and hole edge determines the degree of overload protection. The dimensional change brought about the application of a load to the load cell is limited by the contact of the pin with the edge of the hole in the beam.

The reliability and sensitivity of this type of overload protection depends in part on the alignment of the machined receiving holes, the fit and dimensions of the stepped pin, the clearance between the pin end and the beam, and the mass of the cantilever beam. The overload protection provided by this device appears to be suitable for large load cells but lacks sensitivity for low capacity load cells.

Accordingly, the present invention is directed to a load cell structure having overload protection incorporated into a single unitary structure without requiring the use of additional parts. The structure provides bidirectional protection of the present load cell against both sudden impact forces and loads in excess of rated capacity. The unique constructional features of the load cell structure enable overload protection to be made available for low capacity load cells without changing the external dimensions of the load cell or interfering with the normal operation thereof.

SUMMARY OF THE INVENTION

The present invention is directed to a load cell structure of the type receiving strain gages applied thereto for the measurement of forces. The structure is especially well-adapted for use in connection with low capacity load cells and provides protection against larger than rated loads.

The structure comprises a body of resilient material having a force receiving end and a support end laterally spaced therefrom. Intermediate these ends is an active region which includes first and second transition regions integral with the force receiving and support ends respectively. Upper and lower sensing beams extend between the first and second transition regions to complete the parallelogram configuration of a conventional load cell.

Upper and lower horizontal openings bound the respective upper and lower sensing beams. A sensing beam has at least one strain gage receiving area thereon which is normally adjacent to an expanded portion of the adjacent horizontal opening. The first transition region is provided with a vertical opening that extends generally between the planes containing the midline of the upper and lower horizontal openings. The opposing ends of the vertical opening communicate with the upper and lower horizontal openings through slots. Each slot extends between the vertical opening and the corresponding horizontal opening and has a gap width which determines in part the degree of overload protection provided to the load cell.

The horizontal openings, the vertical opening and the slots form a centrally-located cantilever beam extending from the second transition region to the vertical opening. The upper and lower sensing beams are relatively thin so as to be sensitive to applied loads. As a result, the cantilever beam formed in the central region of the load cell structure is a beam of relatively large mass when compared with combined mass of the sensing beams. By increasing the mass of the beam, the cantilever beam is stiffened accordingly and the overload protection is enhanced. When a load is applied to the load cell, the forces in the load cell structure result in a deflection of the sensing beams. This deflection causes one of the gaps in the slots to begin to narrow with closure thereof occurring at a load level deemed to require protection for the load cell.

At the limit of a stop when the upper or lower gap is closed, the transition region contacts the cantilever beam and the load forces are transferred directly to the cantilever beam from the parallelogram structure. Thus, the cantilever beam and the sensing beams are then acting jointly to prevent permanent deformation of the sensing beams as well as dampening any bounce from a sudden impact load.

The load limit at which the overload protection takes effect is determined primarily by the gap width of the upper and lower slots. The gap width defines the limits of deflection of the parallelogram structure of the load cell in relation to the large mass cantilever beam. In practice, the gap width is formed to initiate protection for loads in excess of 140% of the rated load cell capacity. The width of the upper and lower horizontal openings and the width of the vertical opening in the first transition region are normally made larger than the gap width so as to insure that the gap width is the limiting distance in determining the over load protection imparted to the load cell.

Further features and advantages of the invention will become more readily apparent from the following detailed description of a preferred embodiment thereof when taken in conjunction with the accompanying drawings.

DESCRIPTION OF THE PREFERRED EMBODIMENT

Figure 1:
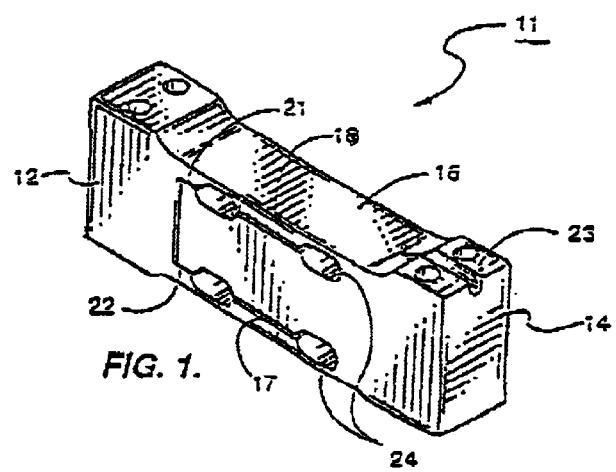
FIG. 1 is perspective view of a preferred embodiment of the present invention.
Figure 2:
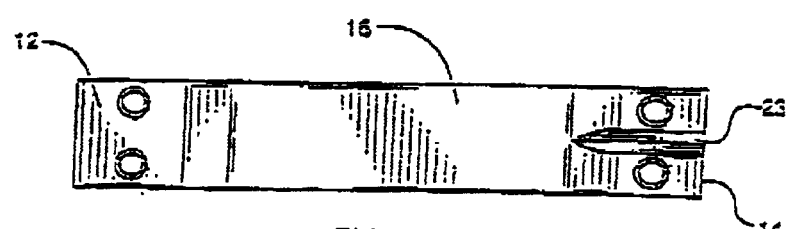
FIG. 2 is a top view of the embodiment of FIG. 1.
Figure 3:
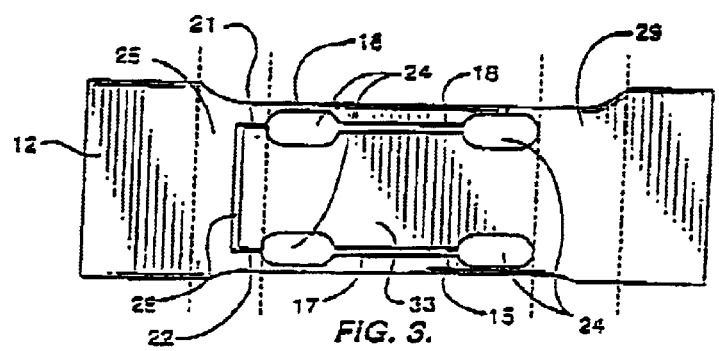
FIG. 3 is a side view of the embodiment of FIG. 1.

Referring now to the drawings of FIGS. 1, 2 and 3 showing the preferred embodiment, the load cell structure of the present invention is shown formed of a single body of resilient material, typically an alloy steel, stainless steel or an aluminum alloy having a number of openings and slots formed therein by conventional machining techniques. As shown, the structure is generally a parallelepiped with opposing defined end sections 12, 14 and top and bottom surfaces therebetween. However, other geometrical shapes can be utilized if desired. The force receiving end 12 is provided with an elevated top section with two holes therein either threaded or through holes, for coupling to a force transmitting member, not shown. The lower portion of the force receiving end extends downwardly of the central region slightly. Similarly, the support end 14 which is affixed to a reference surface is provided with the raised upper section having two holes therein and a lower region which extends below the central region of the structure. A notch 23 is provided in the top of the support end 14 for receiving the electrical connections to the strain gages placed on the sensing beams. The use of four strain gages enables the use of a full bridge circuit located at two or more sites on the structure in measurement applications. The placement and affixation of the strain gages to the sensing beams utilize conventional techniques.

The present load cell structure has upper and lower sensing beams 16, 15 which are the flexure elements in the load cell. The sensing beams are defined by the spaced large area elliptical openings 24 formed at the ends of the horizontal openings 18, 17 and extending through the structure. The upper and lower sensing beams are shown similar in dimension and one or both receives a strain gage affixed to the top and bottom surfaces of the structure at the two flexing regions adjacent openings 24 of each sensing beam. Upper and lower elongated openings 18, 17 extend between each pair of elliptical openings 24 and form the internal boundary of the sensing beams. The sensing beams are spaced from the force receiving end 12 and support end 14 by transition regions which also experience flexure when a load is applied to end 12. While the preferred embodiment utilizes horizontal openings between the relatively wide elliptcal openings, it is to be noted that an opening of uniform width may be utilized in other embodiments of the invention.

The transition regions 25, 29 are shown in the side view of FIG. 3 by the dashed vertical lines. It is to be noted that the first transition region 25 is provided with a vertical opening 28 having a length equal to the distance between the upper sensing beam 16 and the lower sensing beam 15 and orthogonally aligned therewith. The vertical opening 28 communicates with the horizontal openings 17 and 18 through horizontal slots 21 and 22 respectively. As shown, the sensing beams extend between the opposing distal ends of the elliptical openings 24 and thus reside between the transition regions. The transition region provided at each end of the sensing beam insures that the force applied at the load receiving end 12 is not directly applied to the sensing beam. Each transition region is a force translating region which serves to protect the sensing beams. In addition, the vertical opening 28 is incorporated in the first transition region, so that the opening does not weaken the force receiving end of the load cell.

The central region of the load cell structure 11 is a relatively large mass cantilever beam 33 compared to the combined mass of the sensing beams. The cantilever beam extends from the second transition region 29 to the vertical opening 28. The overload protection in the present invention is provided by the combination of the cantilever beam 33 and the slots 21 and 22. The horizontal slots 21 and 22 define the limit of relative movement between the sensing beam and the cantilever beam in both directions to provide protection for excessive loads. The limit of movement of the beams in a given direction to the point of closing the gap and contacting the cantilever beam determines the maximum applied load before the overload protection is engaged. Thus, the width of the gaps formed by slots 21 and 22 is determined by the percent of rated load protection desired. Typically, the gaps are formed so as to provide 140% to 150% of rated load protection and the gap width is less than the width of the horizontal and vertical openings. The gap width range utilized in low capacity load cells constructed in accordance with the present invention is 0.005 to 0.030 inch. The gaps are formed using conventional electrodischarge machining (EDM) equipment.

As seen in FIG. 3, the cantilever beam 33 is comprised of a substantial portion of the mass of the region of the load cell between the transition regions. By increasing the mass of the cantilever beam, it is stiffened when compared with the sensing beams so as to enhance the overload protection. When the cantilever beam and the sensor beams act in concert the load forces are transferred directly to the cantilever beam thus preventing any permanent changes in the load cell structure. The substantially complete utilization of the interior of the load cell structure as the cantilever beam provides the resultant load cell with overload protection and without requiring the use of additional parts to provide the protection. The novel constructional features of the present invention provide an internal beam having sufficient stiffness for overload protection without being coupled to the force applying region by threaded or stepped members.

While the foregoing description has referred to a specific embodiment of the invention, it is to be noted that modifications and variations may be made therein without departing from the scope of the invention as claimed.

What is claimed is:

1. A load cell structure for receiving strain gages for the measurement of applied forces, said structure comprising:
   a. a force receiving end;
   b. a support end;
   c. an active region intermediate the force receiving end and the support end, said active region including:
      i) first and second transition regions, each region being located adjacent to one of the force receiving and support ends;
      ii) upper and lower sensing beams extending between said first and second transition regions, at least one of said sensing beams having a strain gage receiving area thereon;

iii) upper and lower horizontal openings extending between said first and second transition regions, each opening bounding the respective upper and lower sensing beams;
iv) a vertical opening formed in said first transition region and laterally spaced from said upper and lower horizontal openings, said vertical opening having a length equal to the distance between said upper and lower sensing beams;
v) upper and lower slots formed in said first transition region, each slot extending between said vertical opening and the corresponding horizontal opening, and
vi) a cantilever beam extending from the second transition region and bounded by the horizontal and vertical openings and the upper and lower slots, said slots defining relative movement of the cantilever beam upon the application of force to the load cell structure.

2. The load cell structure in accordance with claim 1 wherein each of said horizontal openings has an expanded portion proximate to a strain gage receiving area.

3. The load cell structure in accordance with claim 2 wherein said upper and lower slots have a gap width, the gap width being made narrow compared to the horizontal openings.

4. The load cell structure in accordance with claim 3 wherein each of said upper and lower sensing beams has at least one strain gage receiving area thereon.

5. The load cell structure in accordance with claim 4 wherein each of said upper and lower sensing beams has two strain gage receiving areas thereon, said receiving areas located at opposing ends of the sensing beams.

6. The load cell in accordance with claim 5 wherein said upper and lower horizontal openings have an expanded portion proximate to each strain gage receiving area.

* * * * *